R. E. HELLMUND.
REGENERATIVE CONTROL FOR ALTERNATING CURRENT COMMUTATOR MOTORS.
APPLICATION FILED JAN. 10, 1917.

1,347,904.

Patented July 27, 1920.

5 SHEETS—SHEET 1.

WITNESSES:
R. J. Fitzgerald
O. V. Kennedy

INVENTOR
Rudolf E. Hellmund.
BY
Wesley G. Carr
ATTORNEY

R. E. HELLMUND.
REGENERATIVE CONTROL FOR ALTERNATING CURRENT COMMUTATOR MOTORS.
APPLICATION FILED JAN. 10, 1917.

1,347,904.

Patented July 27, 1920.
5 SHEETS—SHEET 2.

WITNESSES:
R. J. Fitzgerald
O. N. Kennedy

INVENTOR
Rudolf E. Hellmund.
BY
Wesley G. Carr
ATTORNEY

R. E. HELLMUND.
REGENERATIVE CONTROL FOR ALTERNATING CURRENT COMMUTATOR MOTORS.
APPLICATION FILED JAN. 10, 1917.

1,347,904.

Patented July 27, 1920.

5 SHEETS—SHEET 4.

WITNESSES:
R. J. Fitzgerald.
O. U. Kennedy

INVENTOR
Rudolf E. Hellmund.
BY
Cheseley G. Carr
ATTORNEY

R. E. HELLMUND.
REGENERATIVE CONTROL FOR ALTERNATING CURRENT COMMUTATOR MOTORS.
APPLICATION FILED JAN. 10, 1917.

1,347,904.

Patented July 27, 1920.
5 SHEETS—SHEET 5.

WITNESSES:

INVENTOR
Rudolf E. Hellmund,
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

REGENERATIVE CONTROL FOR ALTERNATING-CURRENT COMMUTATOR-MOTORS.

1,347,904.   Specification of Letters Patent.   Patented July 27, 1920.

Application filed January 10, 1917. Serial No. 141,612.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Regenerative Control for Alternating-Current Commutator-Motors, of which the following is a specification.

My invention relates to systems of regenerative control for alternating-current motors of the commutator type, and it has for its object to provide a system of the character designated which shall be susceptible of application to a wide variety of different operating conditions, serving to produce and insure recuperative operation of a simple, stable and effective character.

More specifically, my invention relates to systems of recuperative control for commutator motors wherein the load current traverses the exciting or magnetizing field winding during recuperative operation and wherein auxiliary means are provided for impressing upon said field winding an auxiliary electromotive force of such phase and magnitude as to partially or wholly neutralize variations in the electromotive force of reactive drop across said field winding produced by the load current, thus insuring the falling or drooping-voltage characteristic necessary for stable recuperative operation.

Figure 1:
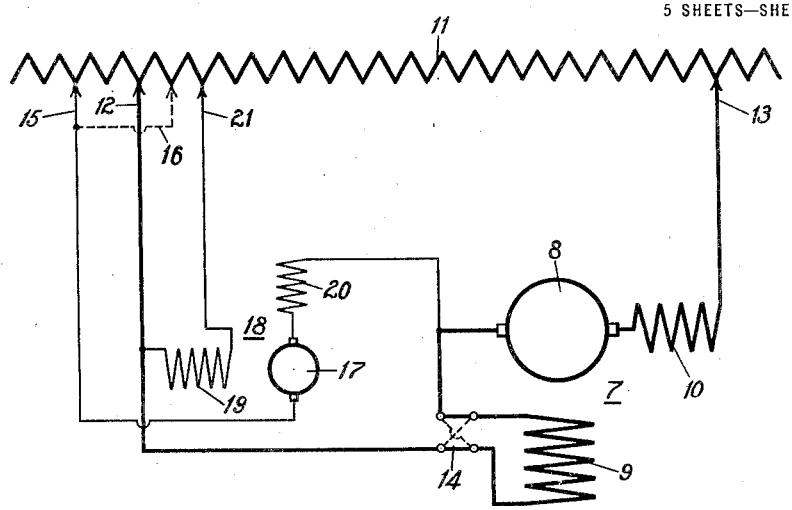
Figure 2:
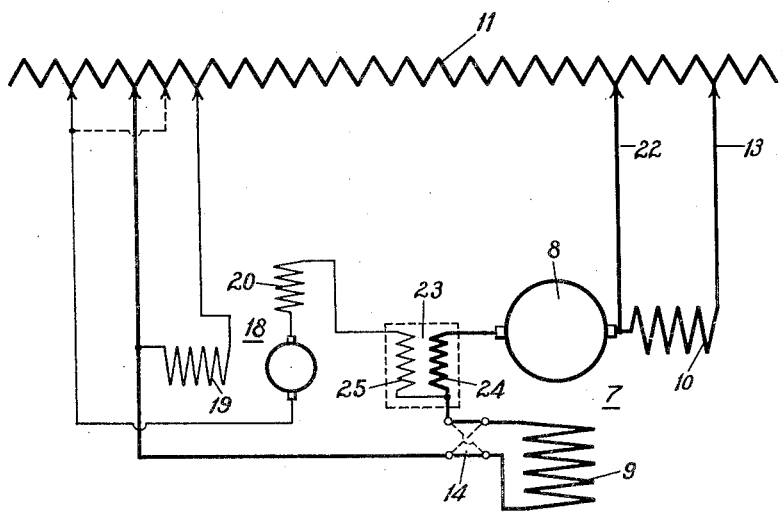
Figure 8:
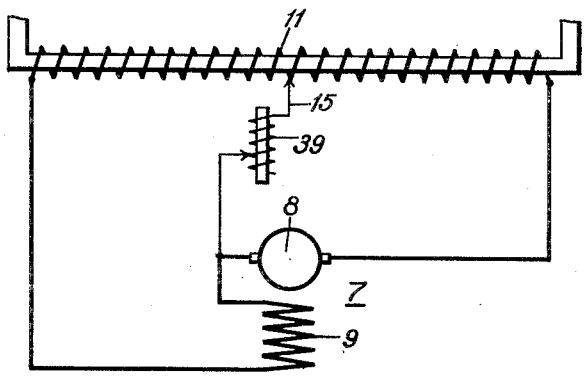
Figure 9:
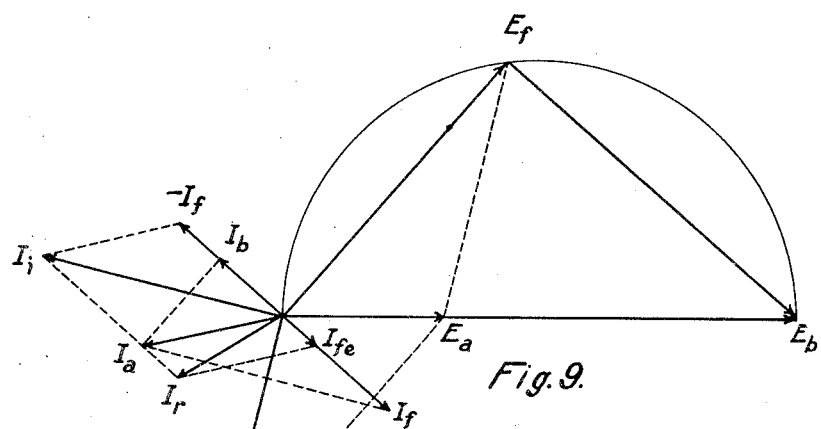

In the accompanying drawing, Figure 1 is a diagrammatic view of an alternating-current motor of the series type, together with its attendant supply and auxiliary circuits, constructed and arranged in accordance with my invention; Figs. 2 to 8, inclusive, and 10 and 11 are similar views illustrating modifications of the system shown in Fig. 1, and Fig. 9 is a vector diagram explanatory of the action of the system of Fig. 8.

It is well known that, with the ordinary repulsion motor rotating in a given direction, the connections of the magnetizing-field winding may be reversed when passing from a motoring to a recuperating condition of operation, whereupon the motor will operate as a recuperative generator with a rising-voltage characteristic. The above operation is obvious, as the load current flowing through the magnetizing-field winding during motoring operation produces a back electromotive force in the motor having a given phase relation with respect to the source. For recuperative operation, the back electromotive force should be increased in amount so as to exceed the electromotive force of the supply but should maintain substantially the same phase with respect thereto. When passing from motoring to recuperating operation, the direction of flow of the load current with respect to the line electromotive force reverses, tending to reverse the polarity of the magnetizing field with respect to the supply electromotive force. By passing the recuperative current through the magnetizing-field winding with the connections reversed, the resultant magnetizing field has the same phase with respect to the supply electromotive force that it had during motoring, thus enabling the production of the desired increased back electromotive force.

It can be shown that the above method of operation may also be employed to advantage in connection with alternating-current commutator motors of the series and doubly-fed types.

All of the above-described recuperative systems may be operated for the return of energy to the system but they do not give a suitably shaped speed-torque curve, permitting the vehicle to assume an excessive speed and, furthermore, they do not give the desired phase of recuperative current to correct the power-factor of the system.

The electromotive force which is operative to excite the magnetizing-field winding results from the reactive drop of the load current across the terminals of the magnetizing-field winding, lagging by substantially 90° with respect to the supply electromotive force. I find that, by providing an auxiliary electromotive force substantially in phase with said reactive drop but having a reverse relation with respect thereto and by supplying said auxiliary electromotive force to the magnetizing-field winding in conjunction with said reactive drop, the desired operating characteristics may be obtained. Thus, the effective electromotive force across the magnetizing-field winding may be actually caused to decrease with an increase in the load current, thus producing a negative compound characteristic, as is desirable for recuperative operation.

In carrying out my invention, I preferably connect the magnetizing-field winding between one of the working windings of the recuperative motor and a point in the supply and I then provide an auxiliary connection from a point intermediate said working and magnetizing-field windings to another point in the supply, preferably independent of any of the main motor tap points. I thus apply to said magnetizing-field winding not only the reactive drop of the load current but also an electromotive force obtained from the source through said auxiliary connection. I further connect means in said auxiliary connection for producing a difference in potential between the ends thereof. Said means may take the form of the generating winding of a phase converter or of any other suitable type of auxiliary dynamo-electric machine or it may take the form of a drop-producing device, such, for example, as resistance or reactance. When employing a reversed magnetizing field winding during recuperation, I find that best results may be obtained by employing a condenser in said auxiliary connection, less favorable results being obtained by the use of an ohmic resistor and still more unfavorable results by the use of an inductive reactor. On the other hand, I find that, when the connections of the magnetizing-field winding are not reversed at the time of transition to recuperative operation, most highly desirable operation may be obtained with an inductive reactor inserted in the auxiliary connection, the use of a resistor or of a condenser being less desirable in the order named. Not only may said drop-producing devices be used singly but they also may be used in combination to produce any desired phase modification of the current flowing in said auxiliary connection, as is known in the art.

The entire foregoing operation may profitably be discussed from the standpoint of currents rather than of voltages, as follows. It has been proposed to employ one of the motors of a locomotive, provided with alternating current motors of the commutator type, as an exciter machine during recuperative operation, said exciter machine supplying quadrature current to the magnetizing-field windings of the remaining motors. Said magnetizing-field windings present a rather large kilovolt-ampere demand and the magnetizing-field windings of three motors of a four-motor equipment demand substantially full-load current from the fourth or exciting machine.

It is frequently desirable, particularly in heavy freight service, to employ all the motors of a locomotive as recuperative machines. It is obvious from the foregoing that, under these conditions, to employ an auxiliary exciting machine for the excitation of all the magnetizing-field windings would necessitate an exciter machine of excessive size and weight. It is, therefore, desirable to derive as large a portion as possible of the magnetization of the main motors directly from the supply.

The magnetizing-field winding of a recuperative motor demands a constant or slightly decreasing energization with an increase in the recuperative load current and it is, therefore, impossible to supply the proper exciting current to the exciting winding under all conditions of recuperative load by means of a straight series excitation. The number of turns may be so adjusted that, for any given recuperative load, the recuperative current produces the proper excitation of the magnetizing-field winding but, for divergence from this recuperative load, it is necessary that current be added or substracted from the recuperative current to obtain proper energization of the magnetizing-field winding. By the auxiliary connection from a point intermediate a magnetizing and a working winding to the supply which is above-described, I am enabled to supply to the magnetizing-field winding the corrective current demanded thereby. Said auxiliary exciting current must be provided by a source of electromotive force which is substantially 90° out of phase with the supply electromotive force and is therefore conveniently provided by a small phase-converter or exciter machine inserted in said auxiliary connection.

By this means, all the motors of a locomotive may be employed for recuperation and be properly excited by the use of a relatively small auxiliary exciting machine.

Other details and features of my invention will be hereinafter more fully described.

Referring to Fig. 1 of the drawing, I show an alternating-current motor of the series type at 7, said motor being provided with an armature 8, a magnetizing-field winding 9 and a cross or neutralizing field winding 10. Energy for the operation of the motor 7 is derived from any suitable source, such, for example, as the secondary winding 11 of a suitable transformer. The motor 7 is connected between suitable taps 12 and 13 on the supply winding 11, and one or both of said taps may be adjusted by any suitable means in order to vary the impressed voltage upon the motor 7. The specific means employed for adjusting said taps constitute no part of the present invention and a showing thereof has, therefore, been omitted, for the sake of clearness and simplicity, but said means preferably takes the form of electrically or pneumatically operated unit switches energized by suitable control means and suitably interlocked, as is well known and understood in the control art. The connections of the magnetizing-field winding 9, with respect to the motor 7, may be reversed by any suitable means indicated at 14. An auxiliary connection is established from a point intermediate the armature 8 and the magnetizing field 9 to a tap 15 on the supply winding and said tap is preferably adjustable to one side or the other of the tap point 12, as indicated by a dotted line 16. Electromotive-force-producing means are inserted in said auxiliary connection and may take the form of the armature 17 of a small phase-converter 18 of the commutator type provided with a magnetizing-field winding 19 and with a cross-field winding 20. The magnetizing-field winding 19 is preferably connected across a portion of the supply winding 11 as, for example, by being connected between the tap point 12 and an auxiliary adjustable tap 21.

Having thus described the arrangement of a system embodying my invention, the operation is as follows: During motoring, the machine 7 operates as an ordinary series motor and the auxiliary connection through the phase-converter 18 may or may not be employed, said connection, by its effect upon the magnetizing-field strength, obviously affecting the speed torque characteristic and power factor of the motor and, therefore lending itself to use in this connection, if desired. For recuperation, with the direction of rotation the same, the switch 14 is reversed, whereupon the recuperative current, 180° removed in phase from the motoring current, produces, in the magnetizing-field winding 9, a field which has substantially the same general direction as the magnetizing-field during motoring. The electromotive force across the terminals of the magnetizing field winding 9 is the reactive drop produced therein by the load current and, accordingly, lags substantially 90° with respect to the electromotive force of the supply. An auxiliary excitation from the tap 15 is imposed upon the magnetizing-field winding 9, the electromotive force thereof being made up of a component in phase with the electromotive force of the supply and proportional to the distance between the taps 12 and 15 and a quadrature component produced in the phase converter 18. Said resulting electromotive force, in which the quadrature component of the phase converter 18 is the major or dominating part, is so applied to the magnetizing-field winding 9 as to neutralize or overcompensate for the rise in potential across said magnetizing - field winding 9 produced by an increase in the load current and to improve the power factor. Thus the total field produced by the magnetizing-field winding 9 either remains substantially constant in amount or decreases with an increase in the recuperative load current as is suitable for recuperative operation. By the adjustment of the tap 15 to the other side of the tap point 12, the auxiliary electromotive force derived directly from the source may be reversed, therefore producing a shift in the phase of the resultant auxiliary electromotive force applied to the magnetizing-field winding 9.

It is frequently desirable that the electromotive force impressed upon the field winding through the auxiliary connection contain not only a fixed component in phase with the supply electromotive force but also a component substantially in phase with the supply electromotive force and variable in accordance with the load current, in order that the shape of the negative compound characteristic may be more flexibly controlled and in order that the size of the phase-converting machine may be still further reduced. The system of Fig. 2 embodies this feature and is otherwise similar to the system of Fig. 1 except that a doubly-fed connection is established by means of a third main tap 22. An auxiliary transformer 23 is provided and comprises a primary winding 24 in series with a working winding of the motor and a secondary winding 25 connected in the auxiliary energizing connection for the magnetizing field winding 9. A change in the load current produces a change in the electromotive force of the secondary winding 25 and said electromotive force is preferably so arranged as to be opposed in phase to the main drop across the magnetizing-field winding 9, whereby an increase in the load current decreases the excitation of said magnetizing-field winding.

Figure 3:
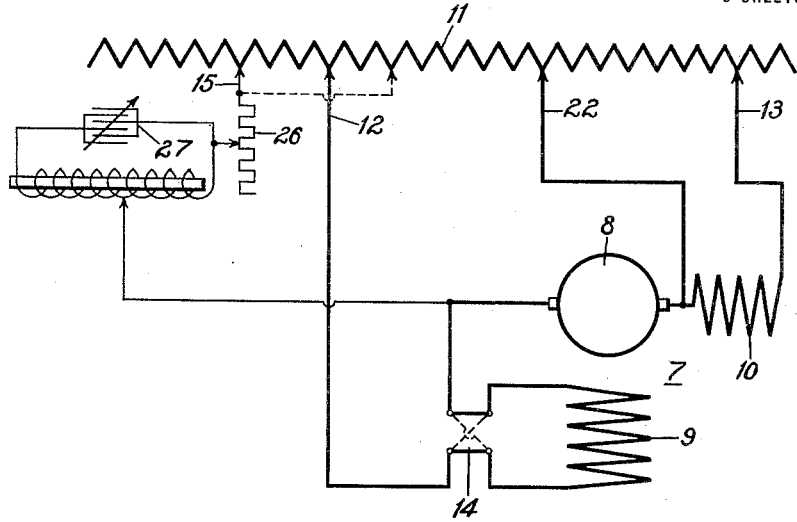

It frequently happens that the operating conditions are such that extremely close regulation is not necessary and, under these conditions, the auxiliary exciting machine may be dispensed with, as indicated in the system of Fig. 3 which illustrates a doubly-fed motor associated with a supply winding and having an auxiliary supply connection for the magnetizing-field winding 9. Said connection is made to an adjustable tap 15 on the supply winding, as in the preceding figures, but is completed through an adjustable resistor 26 and an adjustable condenser 27. Said condenser is preferably connected through the intermediary of an auto-transformer 34, so that the voltage impressed thereupon may be relatively high and the capacity thereof correspondingly reduced. By this means, an electromotive force derived directly from the source for application to the magnetizing-field winding 9 may be suitably altered in phase and in magnitude to obtain the desired recuperative conditions.

Figure 4:
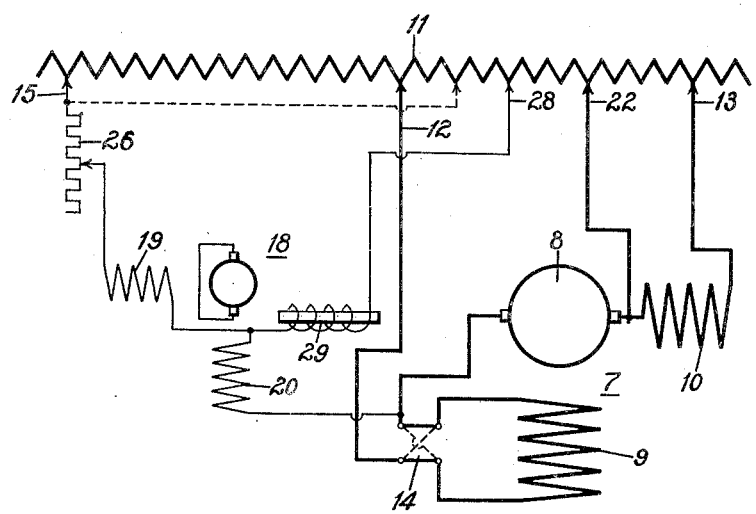

A system of great flexibility is indicated in Fig. 4 wherein the main recuperative motor is shown of the doubly-fed type, as heretofore. A connection is made from a point intermediate the magnetizing-field winding and a working winding of the motor to one terminal of the inducing field winding 20 of a phase-converter 18, shown as of the short-circuited armature type. The inducing and magnetizing-field windings of said phase-converter are connected in series relation, and the outer terminal of the magnetizing-field winding is connected to an adjustable tap 15 through an adjustable resistor 26. An additional connection is made from a point intermediate the field windings 19 and 20 to an adjustable tap 28 through an adjustable reactor 29. The phase and magnitude of the excitation of the field winding 19 may be shifted by adjusting the devices 26 and 29, and the magnitude alone of said excitation may be varied by adjusting the taps 15 and 28. In like manner, the electromotive force supplied directly from the source to the magnetizing-field winding 9 is effected by the movement of the tap 15 to the one side or the other of the tap 12.

Figure 5:
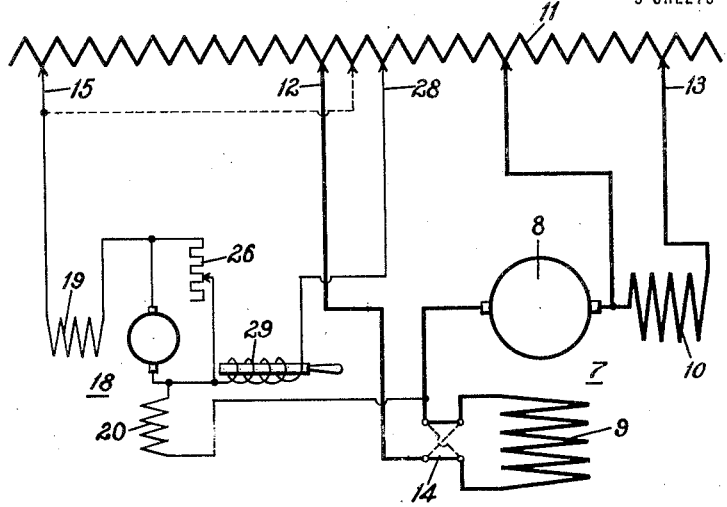

The arrangement of Fig. 4 may be still further varied by inserting the resistor 26 between the brushes of the phase converter, as indicated in the system of Fig. 5.

Figure 6:
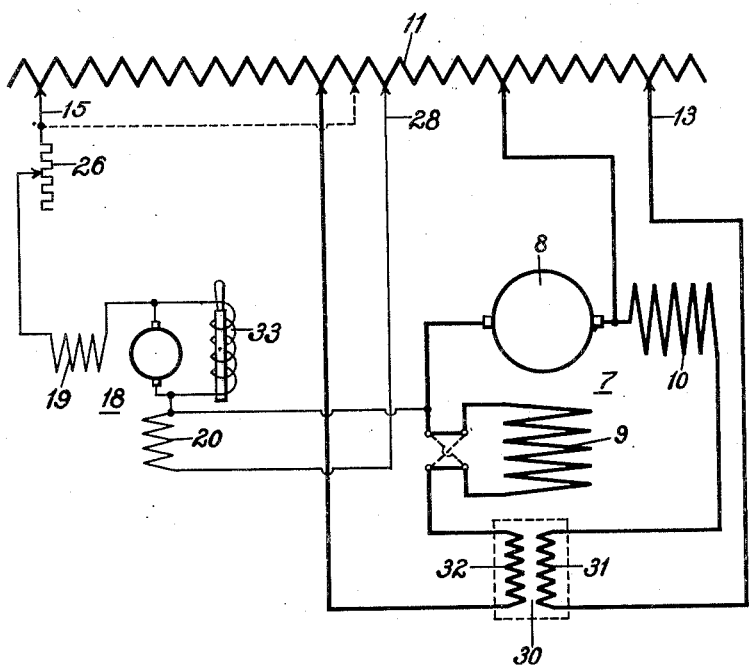

A still further modification of the system described up to this point is shown in Fig. 6. A commutator motor of the doubly-fed type is associated with an auxiliary transformer 30 having its primary winding 31 connected in series with the inducing field winding 10 whereas the secondary winding 32 of said transformer is connected in series with the magnetizing field winding 9. Thus, there is produced, in said secondary winding 32, an electromotive force opposing the reactive drop across the magnetizing-field winding 9 during recuperative operation. Furthermore, said electromotive force varies with the load current, as in the system of Fig. 2, and, therefore, produces a greater or a less neutralizing action upon the excitation of the magnetizing field 9, aiding in obtaining the desired negative compound characteristic. The excitation of the magnetizing field winding 9 is further supplemented by means of an auxiliary connection to a tap 28, said connection traversing the inducing-field winding 20 of a phase-converter 18 of the commutator type having an adjustable reactor 33 inserted in a closed connection between the brushes thereof. The outer terminal of the magnetizing field 19 of said phase converter is connected to a tap 15 through an adjustable resistor 26. The adjustment of the reactor 33 changes the phase of the electromotive force produced in the winding 20, and further adjustments may be secured in the manner heretofore described.

In the foregoing figures, I have shown the magnetizing-field winding energized by either the working current flowing in the armature winding or by that portion of the working current which flows in the cross-field winding, said portion being determined by the transformer ratio between the armature and the cross-field windings. Still another method of deriving excitation for the magnetizing-field winding is to insert said winding in the doubly-fed connection, where it receives the difference between the armature current and the cross-field current, said difference obviously varying in proportion to the load current. I wish it to be distinctly understood that, in any of the foregoing figures, the magnetizing-field winding may be energized by the one or the other of the load-current elements, as herein pointed out, suitable adjustment of the magnetizing-field strength being obtained in each case by providing the proper number of turns therein.

Figure 7:
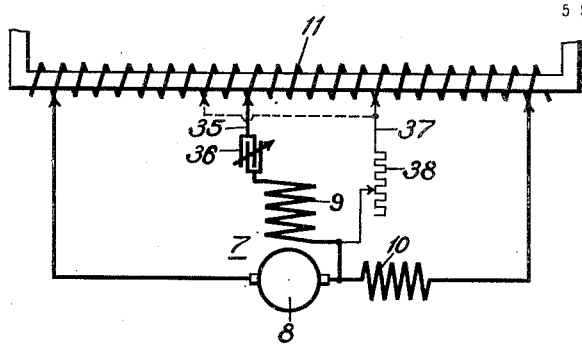

A system wherein the magnetizing-field winding is energized by the difference between the armature and cross-field windings is shown in Fig. 7 wherein the motor 7 is provided with the usual cross-field windings 9 and 10. The armature winding 8 and the cross-field winding 10 are connected across a portion of the source 11, and the magnetizing-field winding 9 is connected between their junction point and a suitable tap point 35 in the source through an adjustable condenser 36. An auxiliary connection is provided between the junction point of the magnetizing-field winding 9 with the remaining windings and an adjustable auxiliary tap member 37 through an adjustable resistor 38. By this means, the proper control of the magnitude and phase of the magnetizing-field may be obtained for the desired recuperative operation.

As mentioned in the introduction to this specification, it is possible to obtain desirable recuperative characteristics with a series type motor without reversing the connections of the magnetizing-field winding at the instant of transition to recuperative operation if the auxiliary connection be established from the junction of the magnetizing-field winding and a working winding to an auxiliary tap point, said auxiliary connection embodying an inductive reactor. A system of this character is shown in Fig. 8 wherein a source of alternating current 11 is connected to energize a series commutator motor 7 comprising an armature 8 and a magnetizing-field winding 9. An auxiliary connection is established from the junction point of said two windings to an adjustable tap member 15 through an adjustable inductive reactor 39.

For a detailed understanding of the manner in which this specific connection provides a suitable speed-torque characteristic and power-factor during recuperation, attention is directed to the vector diagram of Fig. 9. The vector E$a$ represents the supply voltage impressed upon the magnetizing-field winding 9 and, in like manner, the vector E$a$—E$b$ represents the supply voltage impressed upon the armature member 8. The vector E$f$ represents the total voltage across the magnetizing-field winding 9 and the vector E$f$—E$b$ represents the total voltage across the armature member 8 (neglecting ohmic and reactive drops). The field current is in quadrature with the field voltage and is, therefore, indicated by the vector I$f$. The voltage across the inductive reactance 39 must be the vector difference between the voltages E$f$ and E$a$ and may, therefore, be represented by the vector E$i$. The current flowing through said inductive reactor is in quadrature with the applied voltage and may, therefore, be represented by the voltage I$i$. Since the current I$i$ is the vector difference between the field current and the armature current, the armature current may now be obtained by the vector addition of the field current I$f$ and the reactor current I$i$, said armature current being represented by the vector I$a$. The component of the armature current producing braking torque may be obtained by projecting I$a$ upon —I$f$, obtaining I$b$. The regenerative current in the line is obtained by combining the current I$a$ and the vector I$fe$ which represent the field and armature currents as obtained in the line.

The fact that the vector I$a$ is more than 90° removed from the vector I$f$, so that the component I$b$ of the current I$a$ is in phase with —I$f$, shows the possibility of obtaining recuperative operation without reversal of the magnetizing-field connections when an inductive reactor is inserted in the auxiliary connection. Particular attention is directed to this phase of operation as it is contrary to the usual teaching of the prior art.

Figure 10:
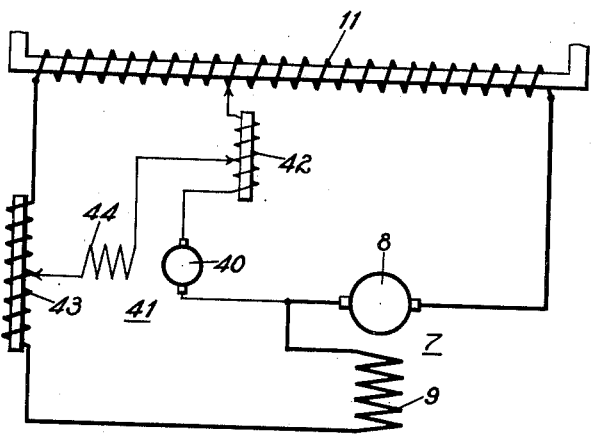
Figure 11:
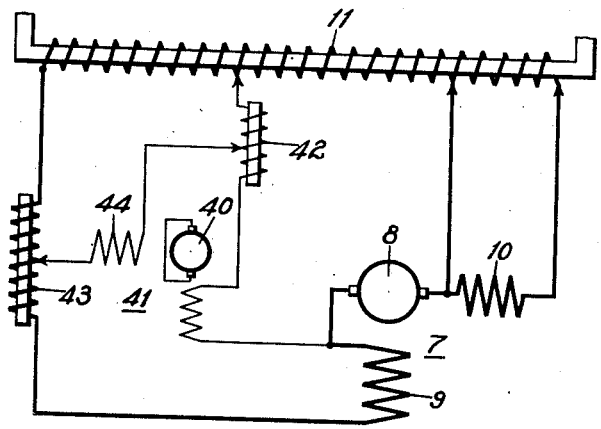

The connections just described, wherein the connections of the magnetizing-field winding are not reversed, may be further modified to accord with the various connections indicated in the systems of Figs. 1 to 6, inclusive, as, for example, by including a suitable exciting machine in the auxiliary connection, as indicated in Figs. 10 and 11.

In Fig. 10, the motor 7 is shown as of the straight series type having the armature member 8 and the magnetizing-field winding 9 connected across a portion of the source 11 and having an auxiliary connection which is completed through the armature 40 of an exciter machine 41 of the commutator type and through an inductive reactor 42. An inductive reactor 43 is connected in series with the outer connection of the magnetizing-field winding 9, and the field winding 44 of the exciter machine 41 is connected between an adjustable tap in the reactor 42 and a similar adjustable tap in the reactor 43. Thus, the phase and magnitude of the excitation of the auxiliary machine 41 may be widely varied, with a consequent wide control of the phase of the current flowing through the auxiliary connection.

The system of Fig. 11 is in general similar to that of Fig. 10 except that the exciter machine 21 is shown as of the armature-short-circuited type and the main motor is shown doubly-fed rather than of the straight series type.

While I have shown my invention in some of its preferred forms, it will be obvious to those skilled in the art that it is susceptible of various minor changes and modifications without departing from the spirit thereof and I desire, therefore, that only such limitations shall be placed thereupon as are imposed by the prior art or as are indicated in the appended claims.

I claim as my invention:

1. The combination with a source of alternating current, of an alternating-current dynamo-electric machine of the commutator type connected thereto and comprising a stator exciting field winding and armature conductors each connected to carry working currents, means for producing and for impressing an electromotive force across the terminals of said exciting winding, said electromotive force comprising a component in phase with the electromotive force of said source and a component out of phase therewith, means for reversing one of said components, and means for driving said machine.

2. The combination with a source of alternating current, of an alternating-current dynamo-electric machine of the commutator type connected thereto and comprising a stator exciting field winding and an armature winding, connections between said windings and said source, a portion of which carry the resultant of the exciting and armature currents, means for injecting an electromotive force in said portion of the connections, said electromotive force embodying a component in phase with the electromotive force of said source and a component out of phase therewith, and means for driving said machine.

3. The combination with a source of alternating current, of an alternating-current motor of the commutator type connected thereto and arranged for recuperative operation, with an exciting-field winding thereof connected in series relation with a working winding, driving means for said machine, means for impressing an electromotive force upon said exciting-field winding which compensates, in part, at least, for changes in the electromotive force impressed upon said exciting-field winding occasioned by changes in the working current, and means for impressing upon said exciting field winding an auxiliary electromotive force comprising a component in phase with the electromotive force of said source and a component out of phase therewith.

4. The combination with a source of alternating current, of an alternating-current motor of the commutator type including an exciting field winding connected thereto, means for reversing said field winding to effect recuperative operation, the exciting-field winding being connected in series relation between a working winding thereof and a point in said source, an auxiliary connection from a point intermediate said working and exciting-field windings and a point in said source other than one of the main points of connection of said motor thereto, and means for inducing an auxiliary electromotive force in said auxiliary connection.

5. The combination with a source of alternating current, of an alternating-current motor of the commutator type including a field exciting winding connected thereto, means for reversing said field winding to effect recuperative operation, the exciting-field winding being connected in series relation between a working winding thereof and a point in said source, an auxiliary connection from a point intermediate said working and exciting field windings and a point in said source other than one of the main points of connection of said motor thereto, and means for producing a difference of potential between the two terminals of said auxiliary connection.

6. The combination with a source of alternating current, of an alternating-current motor of the commutator type including an exciting field winding connected thereto, means for reversing said field winding to effect recuperative operation, the exciting-field winding being connected in series relation between a working winding thereof and a point in said source, an auxiliary connection from a point intermediate said working and exciting field windings and a point in said source other than one of the main points of connection of said motor thereof, means for producing an alternating difference of potential between the two terminals of said auxiliary connection which is de-phased with respect to the electromotive force of said source, and means for altering the phase and magnitude of said difference of potential.

7. The combination with a source of alternating current, of an alternating-current motor of the commutator type connected thereto and arranged for recuperative operation, with an exciting-field winding thereof connected in series relation between a working winding thereof and a point in said source, an auxiliary connection from a point intermediate said working and exciting-field windings and a point in said source other than one of the main points of connection of said motor thereto, a phase-converter operating from said source and having a generating winding thereof connected in said auxiliary connection, whereby an electromotive force may be produced in said connection differing in phase from the electromotive force of said source, and means whereby an additional electromotive force may be produced in said auxiliary connection which varies substantially in accordance with the load current of said machine.

8. The combination with a source of alternating current, of an alternating-current motor of the commutator type connected thereto and arranged for recuperative operation, with an exciting-field winding thereof connected in series relation between a working winding thereof and a point in said source, an auxiliary connection from a point intermediate said working and exciting-field windings and a point in said source other than one of the main points of connection of said motor thereof, a phase-converter operating from said source and having a generating winding thereof connected in said auxiliary connection, whereby an electromotive force may be produced in said connection differing in phase from the electromotive force of said source, and means whereby an additional electromotive force may be produced in said auxiliary connection which is substantially in phase with the electromotive force of said source and which varies in magnitude substantially in accordance with the load current of said machine.

9. In a system of recuperative control, the combination with a source of alternating current, and an alternating-current motor of the commutator type having an armature and a series-connected exciting winding, means for impressing an auxiliary electromotive force upon said exciting field winding, one terminal of said means being connected to the terminal of said field winding farthest from direct connection to said source and the other terminal of said means being connected to said source at other than one of the main points of connection of said motor to said source, means for reversing the connections of said exciting field winding when the motor is momentum-driven to tend to produce a series-generator characteristic, and means for neutralizing the rising tendency of said characteristic by causing said auxiliary electromotive force to oppose the reactive electromotive force across said exciting field winding produced by the load current.

10. The combination with a source of alternating current, of a dynamo-electric machine of the commutator type provided with working windings and an exciting field winding, of means for effecting recuperative operation of said machine comprising means for impressing an auxiliary electromotive force upon said exciting field winding, said electromotive force embodying a component in phase with the electromotive force of said source and a component out of phase therewith, whereby the inherent series-generator action is modified to effect stable recuperative operation.

In testimony whereof, I have hereunto subscribed my name this 30th day of Dec., 1916.

RUDOLF E. HELLMUND.